United States Patent
Yang et al.

(10) Patent No.: US 8,862,772 B2
(45) Date of Patent: Oct. 14, 2014

(54) SYSTEM AND METHOD FOR IMPLEMENTING A MULTILEVEL DATA CENTER FABRIC IN A NETWORK ENVIRONMENT

(71) Applicant: Cisco Technology, Inc., San Jose, CA (US)

(72) Inventors: Yibin Yang, San Jose, CA (US); Chiajen Tsai, Cupertino, CA (US); Liqin Dong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 13/647,909

(22) Filed: Oct. 9, 2012

(65) Prior Publication Data
US 2014/0101336 A1 Apr. 10, 2014

(51) Int. Cl.
*G06F 15/173* (2006.01)
(52) U.S. Cl.
USPC ............................................. 709/238; 709/203
(58) Field of Classification Search
USPC .......... 709/203, 220, 221, 238; 370/326, 338, 370/248, 254, 401, 395.31, 355
See application file for complete search history.

(56) References Cited

U.S. PATENT DOCUMENTS

| | | | | |
|---|---|---|---|---|
| 5,309,437 A * | 5/1994 | Perlman et al. | ................ | 370/401 |
| 6,711,152 B1 * | 3/2004 | Kalmanek et al. | ............. | 370/351 |
| 6,820,120 B1 * | 11/2004 | Keats et al. | ................... | 709/223 |
| 6,934,768 B1 * | 8/2005 | Block et al. | .................... | 709/248 |
| 7,245,640 B2 * | 7/2007 | Kwiatkowski | ................ | 370/528 |
| 7,421,970 B2 * | 9/2008 | Levesque | ...................... | 114/362 |
| 7,685,316 B2 * | 3/2010 | Sukumaran | ................... | 709/246 |
| 8,672,566 B2 * | 3/2014 | Iwao et al. | ..................... | 400/401 |
| 8,699,410 B2 * | 4/2014 | Retana et al. | ................. | 370/328 |
| 2004/0120355 A1 * | 6/2004 | Kwiatkowski | ................ | 370/506 |
| 2008/0056328 A1 * | 3/2008 | Rund et al. | ..................... | 374/102 |
| 2008/0062862 A1 * | 3/2008 | Goyal et al. | ................... | 370/218 |
| 2009/0080436 A1 * | 3/2009 | White et al. | ............. | 370/395.31 |
| 2009/0228604 A1 * | 9/2009 | Miyazaki | ....................... | 709/238 |
| 2010/0008231 A1 * | 1/2010 | Retana et al. | .................. | 370/237 |
| 2012/0011235 A1 * | 1/2012 | Smith et al. | ................... | 709/222 |
| 2012/0149819 A1 * | 6/2012 | Inoki et al. | .................... | 524/264 |
| 2013/0336434 A1 * | 12/2013 | Qin, Yun | ....................... | 375/355 |
| 2014/0050116 A1 * | 2/2014 | Yang et al. | .................... | 370/254 |
| 2014/0149819 A1 * | 5/2014 | Lu et al. | ........................ | 714/748 |

OTHER PUBLICATIONS

Radia Perlman, et al., Multilevel Trill (Transparent Interconnection of Lots of Links), Network Working Group, Internet-Draft, May 30, 2012, 24 pages; http://tools.ietf.org/pdf/draft-perlman-trill-rbridge-multilevel-04.pdf.

* cited by examiner

*Primary Examiner* — Sargon Nano
(74) *Attorney, Agent, or Firm* — Patent Capital Group

(57) ABSTRACT

A method is provided in one example embodiment and includes determining whether a first network element with which a second network element is attempting to establish an adjacency is a client type element. If the first network element is determined to be a client type element, the method further includes determining whether the first and second network elements are in the same network area. If the first network element is a client type element and the first and second network elements are determined to be in the same network area, the adjacency is established. Subsequent to the establishing, a determination is made whether the first network element includes an inter-area forwarder (IAF).

20 Claims, 7 Drawing Sheets

SYSTEM AND METHOD FOR IMPLEMENTING A MULTILEVEL DATA CENTER FABRIC IN A NETWORK ENVIRONMENT

TECHNICAL FIELD

This disclosure relates in general to the field of computer networking and, more particularly, to implementing a multilevel data center fabric architecture in a network environment.

BACKGROUND

TRILL, which stands for Transparent Interconnect of Lots of Links, is an IETF standard that is implemented by devices referred to as routing bridges ("RBridges") or TRILL switches. TRILL combines the advantages of bridges and routers and is the application of link state routing to the VLAN-aware customer-bridging problem. Border Gateway Protocol ("BGP") is the protocol that makes core routing decisions on the Internet. A relatively new architecture for data center networking called Vinci has recently been introduced. The physical topology of this architecture is based on a two-tier fat-tree, where every leaf switch is connected to every spine switch and vice versa. In this architecture, TRILL may be used to enable data forwarding while BGP may be used for route distribution among leafs, via route reflectors ("RR").

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
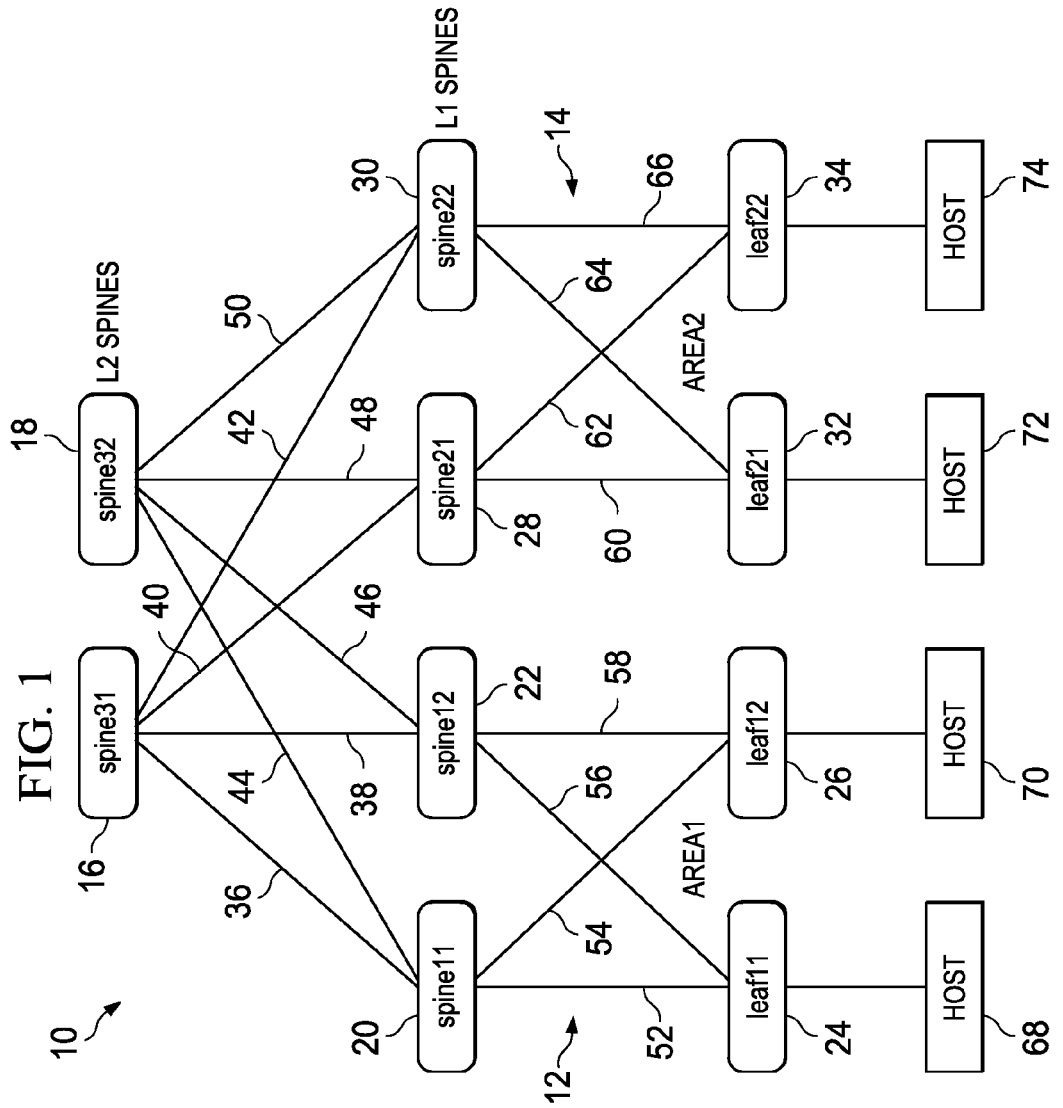
FIG. 1 illustrates an example multilevel Vinci communication system in accordance with aspects of one embodiment of the present disclosure.

A method is provided in one example embodiment and includes determining whether a first network element with which a second network element is attempting to establish an adjacency is a client type element. If the first network element is determined to be a client type element, the method further includes determining whether the first and second network elements are in the same network area. If the first network element is a client type element and the first and second network elements are determined to be in the same network area, the adjacency is established. Subsequent to the establishing, a determination is made whether the first network element includes an inter-area forwarder (IAF). If the first network element comprises an IAF, a message from the IAF is processed and inter-area routes and intra-area routes are sent to the IAF.

In contrast, if the first network element does not comprise an IAF, host routes from the first network element are processed and default or subnet routes pointing to an IAF in the area are sent. If the first network element is determined not to be a client type element, a determination is made whether the first and second network elements are in different network areas and if they are, an adjacency is established between the first and second network elements and inter-area routes are exchanged and original nexthops in routing tables of the first and second network elements are replaced with IAFs. In addition, if the first network element is a client type element and the first and second network elements are determined to be in different network areas, the adjacency is prohibited (e.g., inhibited in any suitable fashion) from being established.

Example Embodiments

Multilevel TRILL is a hierarchical approach to address TRILL scalability issues. Two multilevel TRILL alternatives have been proposed, including "unique nickname" and "aggregated nickname." In the aggregated nickname alternative, border RBridges replace either the ingress or egress nickname filed in the TRILL header of unicasts frames with an aggregated nickname representing the entire area. The aggregated nickname has various advantages over the other alternative, including the fact that it solves the 16-bit RBridge nickname limit; it lessens the amount of inter-area routing information that should be passed in IS-IS; it greatly reduces the reverse path forwarding ("RPF") information, since only the area nickname, rather than all of the ingress RBridges in the area, need to appear; and it enables computation of trees such that the portion computed within a given tree is rooted in that area. The unique nickname alternative enjoys the advantage that border RBridges are simpler and do not need to do TRILL Header nickname modification. The aggregated nickname alternative has two variants, including "border learning" and "swap nickname field." For ease of discussion, it will be assumed throughout this disclosure that aggregated nicknames border learning is used; however, it will be understood that the concepts and embodiments presented herein are equally applicable to the other alternative and variant thereof.

As used herein, "Vinci" refers to a data center fabric architecture built on a spine-leaf topology that provides optimal connectivity at Layer-2 and Layer-3 between hosts that are connected to leaf switches in the fabric and between hosts and the external network. The control plane, enhanced forwarding semantics, and management techniques provide the framework to support Layer-2 or Layer-3 fabrics. Any suitable encapsulation can be used to transport packets across the fabric where the transit nodes switch only on the fabric overlay header. One implementation of the Vinci architecture is based on a TRILL fabric. The Layer-2 and Layer-3 traffic being forwarded between the leaf nodes may be encapsulated in a TRILL header. The nodes in the fabric that provide transit, such as the spine nodes, may switch traffic based on the RBridge nicknames in the TRILL header.

Multilevel TRILL may be used to construct multilevel Vinci, which is a multi-tier data center fabric that provides increased scalability. In multilevel Vinci, multiple two-tier areas may be interconnected by a third-tier spine layer, which serves as an IS-IS L2 subdomain. FIG. 1 illustrates an exemplary multilevel Vinci communication system 10 in accordance with aspects of one embodiment. As shown in FIG. 1, system 10 comprises two two-tier L1 areas, area1, designated by a reference numeral 12, and area2, designated by a reference numeral 14, interconnected by two third-tier spine switches, including spine31, designated by a reference numeral 16, and spine32, designated by a reference numeral 18. Spine switches 16, 18, are referred to herein as "L2 spines." Area1 12 includes two spine switches, spine 11, designated by a reference numeral 20, and spine12, designated by a reference numeral 22, and two leaf switches, including leaf11, designated by a reference numeral 24, and leaf12, designated by a reference numeral 26. Area2 14 also includes two spine switches, including spine21, designated by a reference numeral 28, and spine22, designated by a reference numeral 30, and two leaf switches, including leaf 21, designated by a reference numeral 32, and leaf22, designated by a reference numeral 24. Second-tier spine switches 20, 22, 28, and 30, are referred to herein as L1 spines. L2 adjacencies, represented by lines 36-50, exist between the L2 spines 16, 18, and L1 spines 20, 22, 28, 30. L1 adjacencies, represented by lines 52-66, exist between L1 spines 20, 22, 28, 30, and leafs 24, 26, 32, 34. One or more servers, or hosts, represented in FIG. 1 by servers 68-74, are connected to each of leaf switches 24, 26, 32, 34. In one embodiment, all of switches 16-34 are implemented using RBridges.

In multilevel Vinci, a naïve approach could be taken to apply single level Vinci forwarding and control functions on top of multilevel TRILL. In such an approach, BGP may be used to distribute host routes across L1 areas and leafs may rely on multilevel TRILL for forwarding. This so-called naïve approach is illustrated in FIG. 2.

Figure 2:
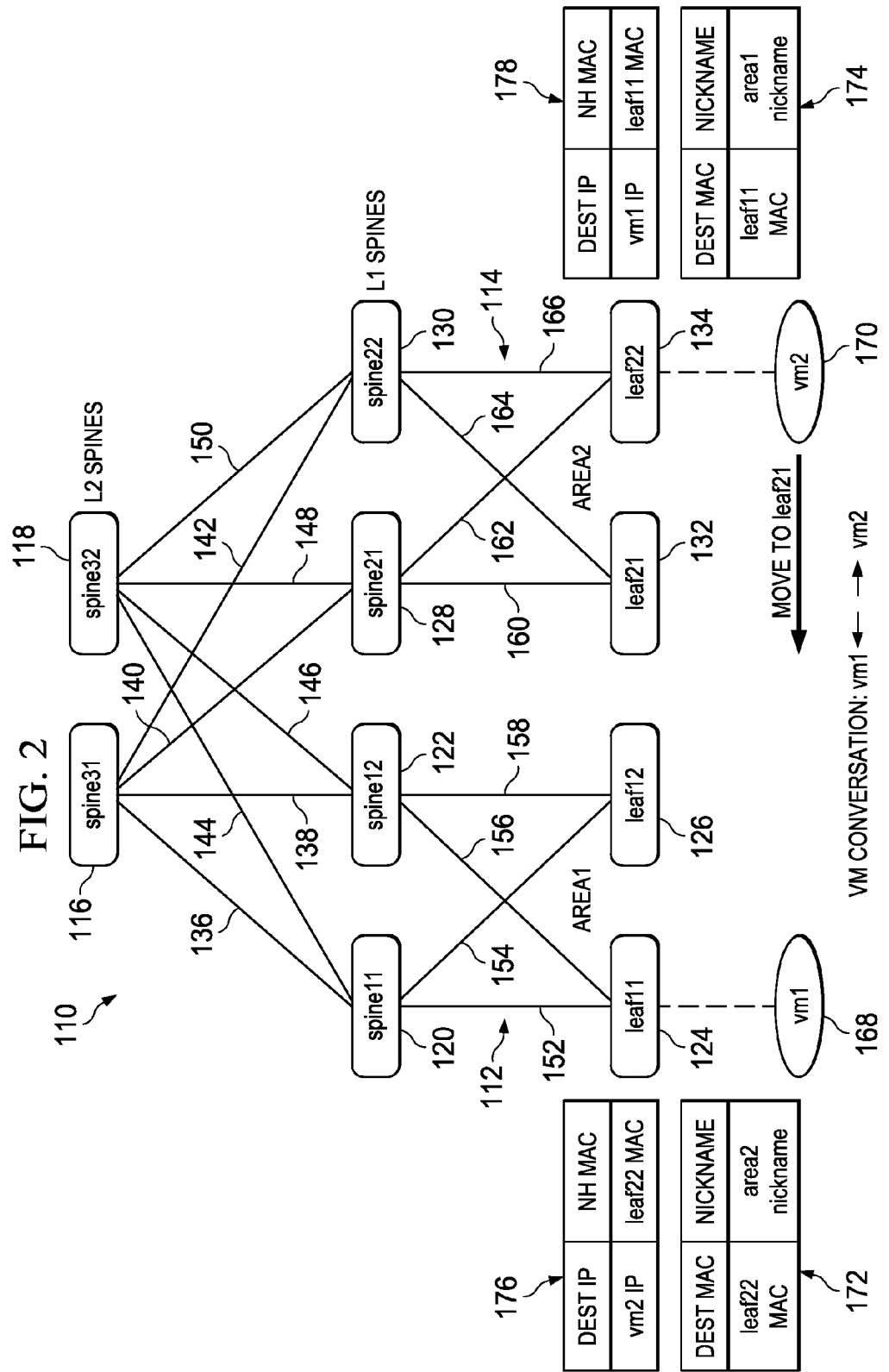
FIG. 2 is a more detailed illustration of an example multilevel Vinci communication system in accordance with aspects of one embodiment of the present disclosure.

Similar to FIG. 1, FIG. 2 illustrates an exemplary multilevel Vinci communication system 110 in accordance with aspects of one embodiment. Communication system 110 comprises two two-tier L1 areas, area1, designated by a reference numeral 112, and area2, designated by a reference numeral 114, interconnected by two third-tier spine switches, including spine31, designated by a reference numeral 116, and spine32, designated by a reference numeral 118. Spine switches 116, 118, are referred to herein as "L2 spines." Area1 112 includes two spine switches, spine11, designated by a reference numeral 120, and spine12, designated by a reference numeral 122, and two leaf switches, including leaf11, designated by a reference numeral 124, and leaf12, designated by a reference numeral 126. Area2 114 also includes two spine switches, including spine21, designated by a reference numeral 128, and spine22, designated by a reference numeral 130, and two leaf switches, including leaf21, designated by a reference numeral 132, and leaf22, designated by a reference numeral 124. Second-tier spine switches 120, 122, 128, and 130, are referred to herein as L1 spines. L2 adjacencies, represented by lines 136-150, exist between the L2 spines 116, 118, and L1 spines 120, 122, 128, 130. L1 adjacencies, represented by lines 152-166, exist between L1 spines 120, 122, 128, 130, and leafs 124, 126, 132, 134. Although not shown in FIG. 2, it will be recognized that one or more servers, or hosts, are connected to each of the leaf switches 124, 126, 132, 134. In one embodiment, switches 116-134 are implemented using RBridges.

As shown in FIG. 2, a virtual machine vm1, designated by a reference numeral 168, hosted by a server (not shown) connected to leaf11 124 communicates with another virtual machine vm2, designated by a reference numeral 170, hosted by a server (not shown) connected to leaf22 134, bi-directionally. Two tables are provided in connection with each of leaf11 124 and leaf22 134. A first table 172, 174, at each leaf 124, 134, respectively, is a MAC address table. Second table 176, 178, at each leaf 124, 134, respectively, is a combination of a Layer 3 forwarding table and an ARP table and will be referred to herein as a routing table. Tables 176, 178, are populated and updated using BGP in a conventional manner.

Each entry of routing tables 176, 178, comprises a "Dest IP", which is the IP address of the destination virtual machine, and a "NH MAC", which is the MAC address associated with the nexthop IP address. Each entry of the MAC address tables 172, 174, comprises a "best MAC", which is the MAC address of the leaf that hosts the destination virtual machine, and a "Nickname", which is the nickname of the area in which the destination virtual machine is hosted. At leaf11 124, the host route to virtual machine vm2 170 is installed and added to routing table 176 via BGP, as will be described in greater detail hereinbelow, and the MAC address of leaf22 134 ("leaf22 mac") is learned with the nickname of area2 ("area2 nickname"), as per the MAC address table 172, via the aggregated nicknames border learning scheme assumed to be used herein. Similarly, at leaf 22 134, the host route to virtual machine vm1 168 is installed and added to routing table 178 via BGP and the MAC address of leaf 11 124 ("leaf11 mac") is learned with the nickname of area1 ("area1 nickname"), per the MAC address table 174.

There are several issues associated with the naive approach described above with reference to FIG. 2. First, the leaf routing tables 176, 178, do not scale as host routes in other areas are installed. For example, leaf11 124 of area1 112 installs the host route of virtual machine vm2 170, which belongs to area2 114. As additional virtual machines are added in area2 114, additional host routes should be added. Clearly, it would not take long for routing table 176 to grow beyond a size that can be economically hosted on a top-of-rack ("TOR") or similar switch typically used to implement leaf switches.

Additionally, the leaf MAC tables 172, 174, do not scale as leaf MAC addresses in other areas are learned. For example, leaf11 124 of area1 112 learns the MAC address of leaf22 134, which belongs to area2 114. This process is repeated for each inter-area leaf MAC address that is learned. Again, it would not take long for MAC address table 172 to grow beyond a size that can be economically hosted on a TOR switch.

Moreover, using the naïve approach, intra-area virtual machine ("VM") mobility impacts other areas. For example, assuming vm2 170 of area2 114 is migrated from leaf22 134 to leaf21 132 (an intra-area migration), leaf11 124 of area1 112, which hosts vm1 168 in communication with vm2 170, is impacted and its routing table 176 should be updated to change NH MAC for vm2 from leaf22 MAC to leaf21 MAC. Additionally, the MAC address table 172 of leaf11 124 needs to learn a new entry with leaf21 MAC address. In general, therefore, the naïve approach is limited in that it fails to fully take advantage of major benefits of the hierarchical structure of multilevel Vinci, which benefits include scalability and stability through information hiding.

To remedy various limitations of the naïve approach described above with reference to FIG. 2, a new component, referred to herein as "inter-area forwarder" or "IAF", is introduced into selected switches, or RBridges, of the communications system. In one embodiment, a switch comprising an IAF may perform lookups on IP headers within TRILL payload and perform a rewrite on TRILL nicknames and inner MAC addresses. In general, switches comprising IAFs provide the following functionality. First, IAFs are designed to serve as an inter-area ingress proxy for an area. In particular, leafs within an area forward inter-area traffic to an IAF for the area, which relays the traffic to destinations in other areas. For this purpose, the IAF needs to maintain inter-area information. Additionally, IAFs are designed to serve as an inter-area egress proxy for an area. In particular, IAFs in other areas forward inter-area traffic to the IAF, which will relay the traffic to destinations with its area. For this purpose, the IAF needs to maintain intra-area information. An IAF typically serves as both ingress and egress proxies for an area. Alternatively, a single IAF may serve as both ingress and egress proxies for multiple areas or as an ingress proxy for one area while simultaneously serving as an egress proxy for another area.

Figure 3:
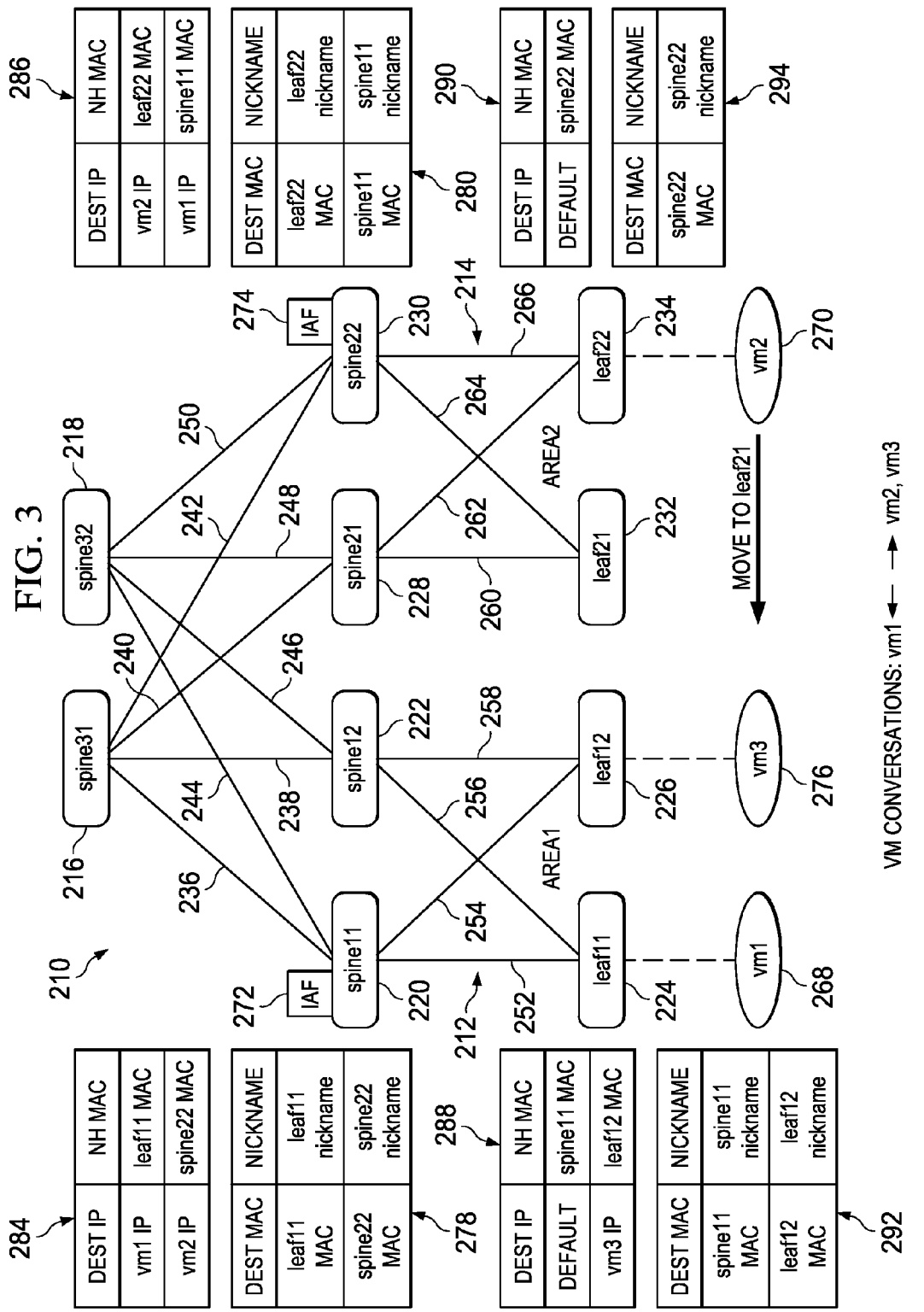
FIG. 3 illustrates inter-area forwarder (IAF) deployment in a multilevel Vinci communication system in accordance with an embodiment of the present disclosure.

FIG. 3 illustrates IAF deployment in a multilevel Vinci communication system 210 in accordance with an embodiment. Communication system 210 comprises two two-tier L1 areas, area1, designated by a reference numeral 212, and area2, designated by a reference numeral 214, interconnected by two third-tier spine switches, including spine31, designated by a reference numeral 216, and spine32, designated by a reference numeral 218. Spine switches 216, 218, are referred to herein as "L2 spines". Area1 212 includes two spine switches, spine11, designated by a reference numeral 220, and spine12, designated by a reference numeral 222, and two leaf switches, including leaf11, designated by a reference numeral 224, and leaf12, designated by a reference numeral 226. Area2 214 also includes two spine switches, including spine21, designated by a reference numeral 228, and spine22, designated by a reference numeral 230, and two leaf switches, including leaf21, designated by a reference numeral 232, and leaf22, designated by a reference numeral 224. Second-tier spine switches 220, 222, 228, and 230, are referred to herein as L1 spines. L2 adjacencies, represented by lines 236-250, exist between the L2 spines 216, 218, and L1 spines 220, 222, 228, 230. L1 adjacencies, represented by lines 252-266, exist between L1 spines 220, 222, 228, 230, and leafs 224, 226, 232, 234. Although not shown in FIG. 3, it will be recognized that one or more servers, or hosts, are connected to each of the leaf switches 224, 226, 232, 234. In one embodiment, switches 216-234 are implemented using RBridges.

As shown in FIG. 3, a virtual machine vm1, designated by a reference numeral 268, hosted by a server (not shown) connected to leaf11 224 communicates with another virtual machine vm2, designated by a reference numeral 270, hosted by a server (not shown) connected to leaf22 224, bi-directionally. Additionally, an IAF 272, 274, is deployed in each of L1 spine switches spine11 220 and spine22 230. IAF 272 serves as ingress and egress proxies for area1 212 and IAF 274 serves as ingress and egress proxies for area2 214. Each of switches spine11 220 and spine22 230 has associated therewith a MAC address table 278, 280, and a routing table 284, 286.

As will be described in greater detail below, as an ingress proxy for area1 212, IAF 272 installs the host route for vm2 270 ("vm2 IP") to area2 214, while as an egress proxy for area1 212, IAF 272 installs the host route for vm1 268 ("vm1 IP") to area1 212. Similarly, as ingress and egress proxies for area2 214, IAF 274 installs area2 related inter-area routes (e.g., vm1 IP) and intra-area routes (e.g., vm2 IP), respectively. Because inter-area host routes are not installed on leafs 224, 226, 242, 234, the leafs use default routes to send inter-area traffic to the IAFs in their own areas. For example, leaf11 224 of area1 212 uses the default route designated in its routing table 288 to send inter-area traffic to area1 IAF 272 in spine11 220. Similarly, leaf22 234 of area2 214 uses the default route to send inter-area traffic to the area2 IAF 274 in spine22 230.

Each spine switch designated as an IAF has installed thereon host routes that result in inter-area traffic being forwarded to the IAF of the area in which the host is resident. For example, as an ingress IAF for area1 212, spine11 220 uses host route vm2 IP to route traffic destined for vm2 270 in area2 214 to spine22 230, which serves as an egress IAF for area2. Similarly, as an ingress IAF for area2 214, spine22 240 uses vm1 IP to send traffic destined for vm1 268 to spine11 220, which serves as an egress IAF for area1 212. The inter-area traffic between area1 212 and area2 214 goes through the L2 subdomain via IAFs 272, 274. For example, a data frame forwarded from vm1 268 to vm2 270 is first forwarded to the area1 IAF 272 in spine11 220, then to the area 2 IAF 274 in spine22 230, and finally to vm2 270 at leaf22 234.

Referring again to FIG. 3, it will be assumed for the sake of example that vm1 226 also communicates bidirectionally with another area1 virtual machine, vm3, designated by a reference numeral 276, hosted by a server (not shown) connected to leaf12 226. As a result, intra-area host route for vm3 ("vm3 IP") is installed in routing table 288 of leaf11 224 along with the default route. In contrast to the scenario illustrated in FIG. 2, leafs 224, 234, in FIG. 3 do not include any inter-area host route information in their routing tables 288, 290, and MAC table 292, 294; instead, all inter-area traffic is routed from the leafs using the default route. This arrangement therefore lends itself to much greater scalability. Moreover, even though L2 spines that host IAFs (e.g., spine11 220 and spine22 230) have to maintain inter-area information, the MAC tables 278, 280, of those spines should be smaller in size, as the tables learn entries to other areas' IAFs (at the L1 spine) instead of leaf switches. Additionally, MAC table 278 of spine11 220 has an entry corresponding to the IAF of area2 212 (i.e., IAF 274 in spine22 230) instead of an entry corresponding to leaf22 234 of area2. This clearly facilitates hiding of area2 information from area1, which leads to a desirable result that an inter-area migration of vm2 270 from leaf22 234 to leaf21 232 will be transparent to area1 212. As a result, the various limitations associated with the naïve approach with regard to scalability and transparency, as described above, are resolved with the approach described herein.

It will be recognized that there may generally exist a philosophy, if not a mandate, that data center fabric spines should be implemented as simple and layer 3 unaware. From the perspective of the L2 subdomain, L1 spines are leafs to L2 spines, which should be acceptable to have layer 3 knowledge; therefore, the above-noted philosophy is arguably not violated by the embodiment illustrated in FIG. 3. However, assuming for the sake of example IAFs are prohibited from being incorporated into L1 spines, the IAFs could instead be advantageously incorporated into leaf switches, as illustrated in FIG. 4.

Figure 4:
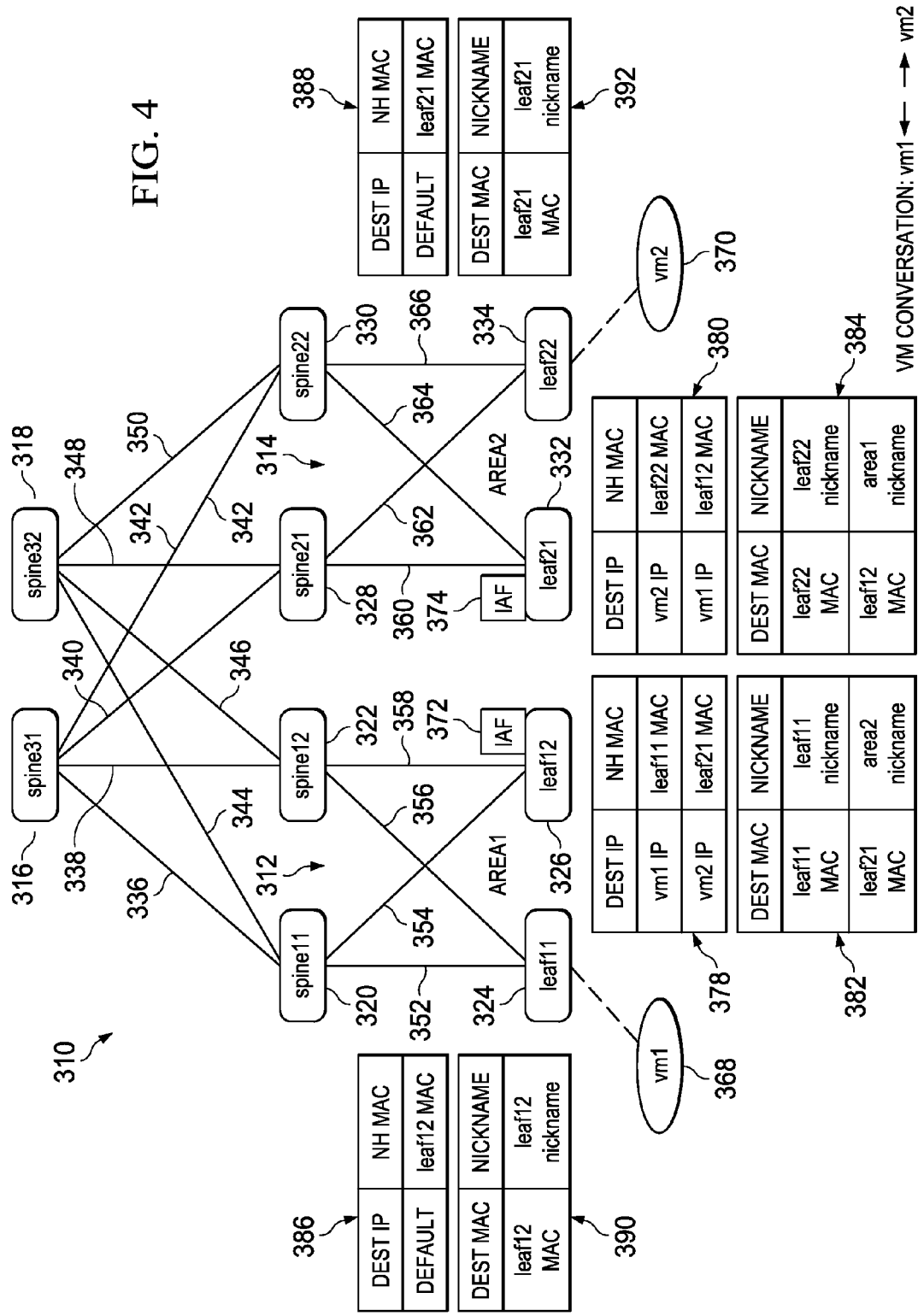
FIG. 4 illustrates an alternative IAF deployment in a multilevel Vinci communication system in accordance with an embodiment of the present disclosure.

FIG. 4 illustrates an alternative IAF deployment in a multilevel Vinci communication system 310 in accordance with an embodiment. Communication system 310 comprises two two-tier L1 areas, area1, designated by a reference numeral 312, and area2, designated by a reference numeral 314, interconnected by two third-tier spine switches, including spine31, designated by a reference numeral 316, and spine32, designated by a reference numeral 318. Spine switches 316, 318, are referred to herein as "L2 spines." Area1 312 includes two spine switches, spine11, designated by a reference numeral 320, and spine12, designated by a reference numeral 322, and two leaf switches, including leaf11, designated by a reference numeral 324, and leaf12, designated by a reference numeral 326. Area2 314 also includes two spine switches, including spine21, designated by a reference numeral 328, and spine22, designated by a reference numeral 330, and two leaf switches, including leaf21, designated by a reference numeral 332, and leaf22, designated by a reference numeral 324. Second-tier spine switches 320, 322, 328, and 330, are referred to herein as L1 spines. L2 adjacencies, represented by lines 336-350, exist between the L2 spines 316, 318, and L1 spines 320, 322, 328, 330. L1 adjacencies, represented by lines 352-366, exist between L1 spines 320, 322, 328, 330, and leafs 324, 326, 332, 334. Although not shown in FIG. 4, it will be recognized that one or more servers, or hosts, are connected to each of leaf switches 324, 326, 332, 334. In one embodiment, switches 316-334 are implemented using RBridges.

As shown in FIG. 4, a virtual machine vm1, designated by a reference numeral 368, hosted by a server (not shown) connected to leaf11 324 communicates with another virtual machine vm2, designated by a reference numeral 370, hosted by a server (not shown) connected to leaf22 324, bi-directionally. Additionally, an IAF 372, 374, is deployed in each of leaf switches leaf12 326 and leaf21 332. IAF 372 serves as ingress and egress proxies for area1 312 and IAF 374 serves as ingress and egress proxies for area2 314. Each of switches leaf12 326 and leaf21 332 has associated therewith a routing table 378, 380, and a MAC address table 382, 384, respectively. Similarly, each of switches leaf11 324 and leaf22 334 has associated therewith a routing table 386, 388, and a MAC address table 390, 392, respectively.

Due to the availability of multilevel TRILL forwarding, IAFs 372, 374, disposed in leaf switches of different L1 areas can reach each other across the L2 subdomain in a manner similar to that described above with reference to FIG. 3. It will be recognized, however, that this arrangement may result in suboptimal inter-area forwarding. For example, a data frame forwarded from vm1 368 to vm2 370 will first go through spine11 320 to leaf12 326 (as per the default route, since leaf11 324 lacks a host route for vm2), which includes IAF 372, which functions as the ingress IAF for area1 312. The data frame may return to spine11 320 before exiting area1 312 destined for IAF 374 at leaf21 332 (as per the vm2 IP host route), which is the egress IAF for area2 314. Similar, a data frame forwarded from vm2 370 to vm1 368 will first go through spine22 330 to leaf 21 332 (as per the default route, since leaf22 334 lacks a host route for vm1), which includes IAF 374, which functions as the ingress IAF for area2 314. The data frame may return to spine22 330 before exiting area2 314 destined for IAF 372 at leaf12 326 (per the vm1 IP host route), which is the egress IAF for area1 312.

It will be noted that, in an alternative embodiment to that illustrated in FIG. 4, an IAF may be disposed at every leaf switch 324, 326, 332, 334. In many respects, such an embodiment is equivalent to the naïve approach described above with reference to FIG. 2 and will therefore not be further described herein.

Figure 5:
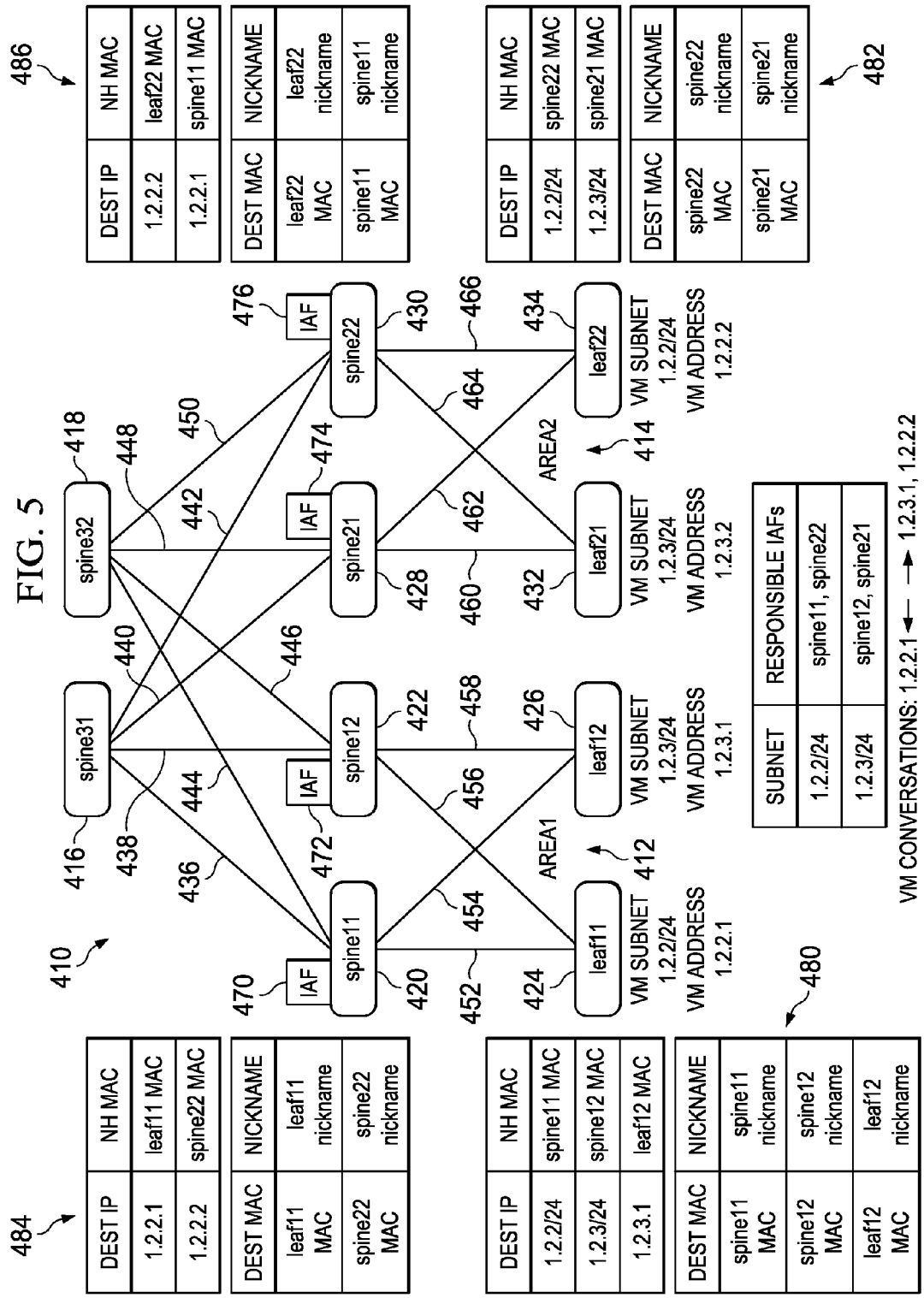
FIG. 5 illustrates IAF deployment in a multilevel Vinci communication system employing a subnet-based scheme in accordance with an embodiment of the present disclosure.

In the IAF scenarios illustrated in FIGS. 3 and 4, a default route scheme is advantageously employed to perform inter-area forwarding; that is, leaf switches use default routes to send inter-area traffic to an intra-area IAF, which results in IAFs being burdened to maintain all inter-area routes. In an alternative embodiment, as an enhancement to the default routing scheme described above with reference to FIGS. 3 and 4, a subnet-based scheme may be employed. FIG. 5 illustrates IAF deployment in a multilevel Vinci communication system 410 using subnet-based scheme in accordance with an embodiment. Communication system 410 comprises two two-tier L1 areas, area1, designated by a reference numeral 412, and area2, designated by a reference numeral 414, interconnected by two third-tier spine switches, including spine31, designated by a reference numeral 416, and spine32, designated by a reference numeral 418. Spine switches 416, 418, are referred to herein as "L2 spines." Area1 412 includes two spine switches, spine11, designated by a reference numeral 420, and spine12, designated by a reference numeral 422, and two leaf switches, including leaf11, designated by a reference numeral 424, and leaf12, designated by a reference numeral 426. Area2 414 also includes two spine switches, including spine21, designated by a reference numeral 428, and spine22, designated by a reference numeral 430, and two leaf switches, including leaf21, designated by a reference numeral 432, and leaf22, designated by a reference numeral 434. Second-tier spine switches 420, 422, 428, and 430, are referred to herein as L1 spines. L2 adjacencies, represented by lines 436-450, exist between the L2 spines 416, 418, and L1 spines 420, 422, 428, 430. L1 adjacencies, represented by lines 452-466, exist between L1 spines 420, 422, 428, 430, and leafs 424, 426, 432, 434. Although not shown in FIG. 3, it will be recognized that one or more servers, or hosts, are connected to each of leaf switches 424, 426, 432, 434. In one embodiment, switches 416-434 are implemented using RBridges.

As illustrated in FIG. 5, area1 412 has two IAFs, one (IAF 470) at spine11 420 and another (IAF 472) at spine12 422. Similarly, area2 414 also has two IAFs, one (IAF 474) at spine21 428 and another (IAF 476) at spine22 430. Additionally, two subnets, designated subnet 1.2.2/24 and 1.2.3/24, are defined. In each area 412, 414, each IAF 470-476 is responsible for only a portion of the subnets. It will be assumed for the sake of example that in area1 412, IAF 470 at spine11 420 is responsible for subnet 1.2.2/24 and IAF 472 at spine12 422 is responsible for subnet 1.2.3/24, while in area2 414, IAF 474 at spine21 428 is responsible for subnet 1.2.3/24 and IAF 476 at spine22 430 is responsible for subnet 1.2.2/24. Each leaf 424, 426, 432, 438, installs subnet routes, rather than host/default routes, to the responsible IAFs in its area. For example, leaf11 424 of area1 412 installs subnet routes 1.2.2/24 and 1.2.3/24, pointing to spine11 420 and spine12 422, respectively, in its routing table 480. Although not shown, leaf12 426 does the same. Similarly leaf22 434, of area2 414 installs subnet routes 1.2.2/24 and 1.2.3/24, pointing to spine22 430 and spine21 428, respectively, in its routing table 482. Again, although not shown, leaf21 432 does the same. As a result, each IAF 470-476 only needs to install intra-area and inter-area routes specific to the subnets for which it is responsible. For example, spine11 420 only installs two host routes, including host route 1.2.2.1 and 1.2.2.2., which are specific to subnet 1.2.2/24, as shown in routing table 484. Similarly, spine22 430 also only installs two host routes, including host route 1.2.2.1 and 1.2.2.2., which are specific to subnet 1.2.2/24, as shown in routing table 486. Although not shown, it will be recognized that each of spine12 422 and spine21 428 also install only two host routes, including host routes 1.2.3.1 and 1.2.3.2, which are specific to subnet 1.2.3/24.

There are additional advantages associated with the subnet-based scheme illustrated in FIG. 5. For example, when a leaf's routing table overflows, intra-area host routes can be removed and routing can depend on subnet routes and responsible IAFs for forwarding. A benefit to this is that the forwarding is still optimal; however, equal cost multipath routing ("ECMP") may be reduced, as fewer IAFs can be used for a particular subnet. Additionally, if a subnet is local to an area (i.e., if all of the virtual machines of the subnet reside in the same area), its subnet route can be installed in IAFs of other areas, replacing host routes specific to the subnet.

With regard to load balancing, the default route scheme (FIG. 3) employs a single pass ECMP hash algorithm on packet fields, while the subnet-based scheme (FIG. 5) is equivalent to using a two-pass ECMP hash algorithm comprising a first hash on the destination subnet and a second hash on packet fields. Depending on the traffic pattern, the subnet-based scheme may achieve the same or a lower degree of load balancing than the default route scheme; however, the subnet-based scheme is definitely better in facilitating a tradeoff between the size of IAF routing tables and the number of ECMP paths.

Figure 6:
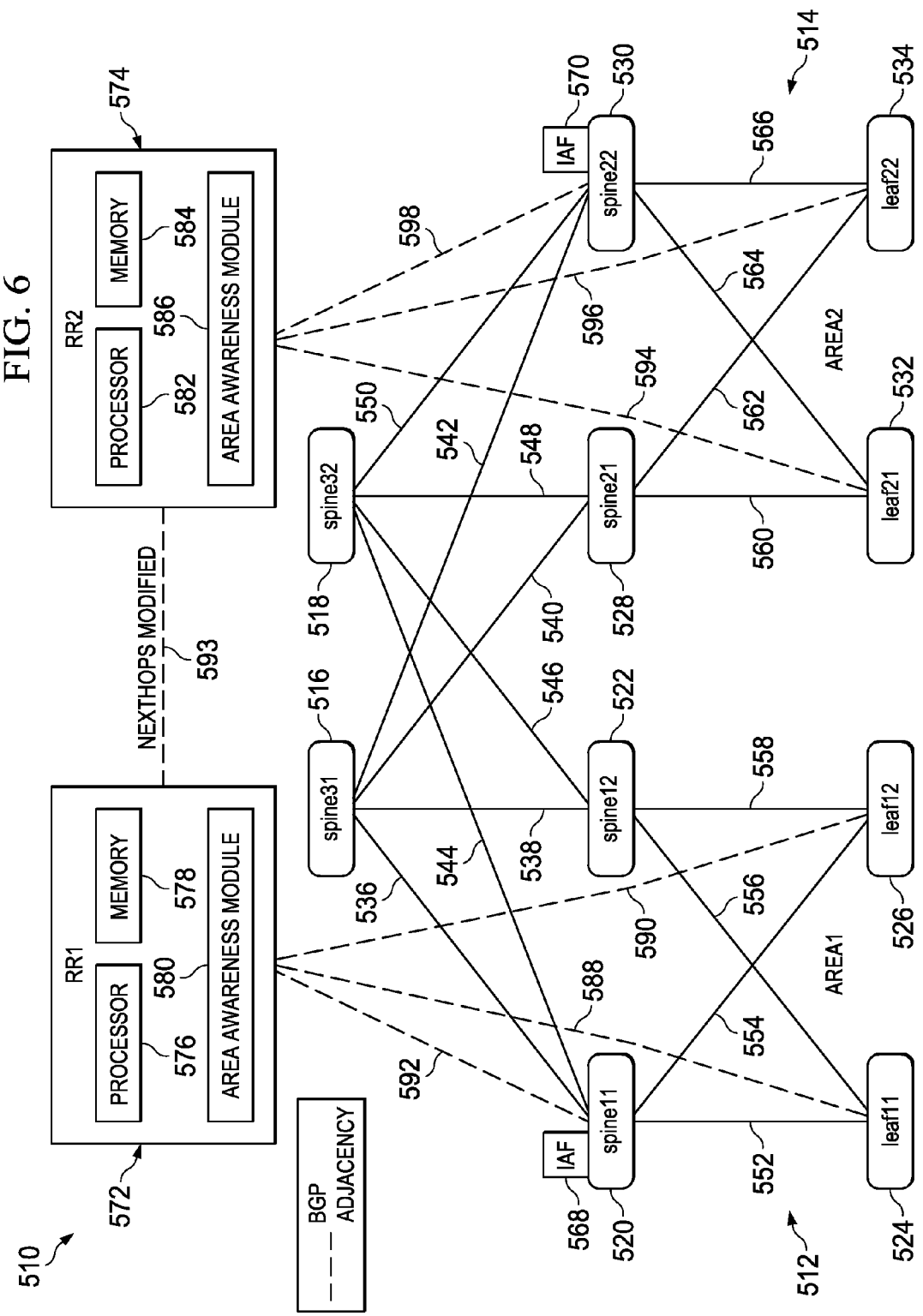
FIG. 6 illustrates a multilevel Vinci communication system in which each area is associated with its own BGP cluster in accordance with one embodiment of the present disclosure.

As a complement to the communications systems illustrated in FIGS. 3-5 and described above, area-awareness may be built into BGP. FIG. 6 illustrates a multilevel Vinci communication system 510 in which each area is associated with its own BGP cluster in accordance with one embodiment. Communication system 510 comprises two two-tier L1 areas, area1, designated by a reference numeral 512, and area2, designated by a reference numeral 514, interconnected by two third-tier spine switches, including spine31, designated by a reference numeral 516, and spine32, designated by a reference numeral 518. Spine switches 516, 518, are referred to herein as "L2 spines." Area1 512 includes two spine switches, spine11, designated by a reference numeral 520, and spine12, designated by a reference numeral 522, and two leaf switches, including leaf11, designated by a reference numeral 524, and leaf12, designated by a reference numeral 526. Area2 514 also includes two spine switches, including spine21, designated by a reference numeral 528, and spine22, designated by a reference numeral 530, and two leaf switches, including leaf21, designated by a reference numeral 532, and leaf22, designated by a reference numeral 534. Second-tier spine switches 520, 522, 528, and 530, are referred to herein as L1 spines. L2 adjacencies, represented by lines 536-550, exist between the L2 spines 516, 518, and L1 spines 520, 522, 528, 530. L1 adjacencies, represented by lines 552-566, exist between L1 spines 520, 522, 528, 530, and leafs 524, 526, 532, 534. Although not shown in FIG. 3, it will be recognized that one or more servers, or hosts, are connected to each of leaf switches 524, 526, 532, 534. In one embodiment, switches 516-534 are implemented using RBridges. IAFs 568, 570 are disposed at spine11 520 and spine22 530.

System 510 further includes two route reflectors ("RR"), including RR1, associated with area1 512 and designated by a reference numeral 572, and RR2, associated with area2 514 and designated by a reference numeral 574. For purposes that will be described in detail below, RR1 572 includes a processor 576, memory 578, and an area-awareness module 580 for providing area-awareness to BGP in accordance with features of embodiments described herein. Similarly, RR2 574 includes a processor 582, memory 584, and an area-awareness module 586 for providing area-awareness to BGP in accordance with features of embodiments described herein.

In accordance with features of one embodiment, RRs may establish adjacencies with all leafs and IAFs in its respective area, or cluster. It may also establish adjacencies with RRs of other areas, or clusters. For example, RR1 572 of area1 512 establishes adjacencies 588-593, respectively, with leaf11 524 and leaf12 526 of area1 512, IAF spine11 520 of area1 512 and RR2 574 of a cluster associated with area2 514. Similarly, RR2 574 of area1 514 establishes adjacencies 594-598 and 593, respectively, with leaf21 532 and leaf22 534 of area2 514, IAF spine22 530 of area2 514 and RR1 572 of a cluster associated with area1 512.

In one embodiment, area-awareness modules 580, 586, implement an enhanced BGP that associates each RR along with its client peers with an area ID. For example, BGP instances in RR1 572 and in the client peers thereof (leaf11 524, leaf12 526 and spine11 520) may be associated with an ID of area1 512 ("area1ID"). BGP instances in RR2 574 and in the client peers thereof (leaf21 532, leaf22 534 and spine 22 530) may be associated with an ID of area2 514 ("area2ID"). For a switch, TRILL IS-IS configuration can be used to derive the area association of BGP. When a BGP adjacency is initially established within a cluster, a check should be performed to ensure that both ends (i.e., the RR and the potential client leaf or spine switch) have the same area_id and are therefore in the same area. On the other hand, when an adjacency is formed between two clusters (that is, between two RRs), the ends (i.e., the RRs) need to ensure that the two RRs have different area_ids and are therefore in different areas. For this purpose, a new optional parameter type, designated area_id, may be introduced into the BGP OPEN message, as described in IETF RFC 4271 entitled A Border-Gateway Protocol 4 (BGP4). As will be recognized, the BGP OPEN message is the first message exchanged after a TCP connection is opened between two ends. The area_id parameter may be included in the Optional Parameters field of the BGP OPEN message as described in the aforementioned RFC 4271.

It will be recognized that RRs 572, 574, need to have an awareness of IAFs 568, 578, respectively, because when they distribute an interarea route, the distributed route needs to point to the IAF of the area, rather than the VM host, as the nexthop. In particular, an RR should distribute default or subnet routes to leafs in its area, which point to IAFs in the area as nexthops. Additionally, when distributing routes to another cluster, an RR should replace its original nexthops with the IAFs in its area. Finally, an RR should assign subnet responsibilities to IAFs in its area, provided the subnet-based scheme is employed. For this purpose, in one embodiment, a new message type, designated IAF_INFO provides the IP address of the IAF(s) to RRs 572, 574, so the RR can use the IAF information in populating the tables, as described above.

Figure 7:
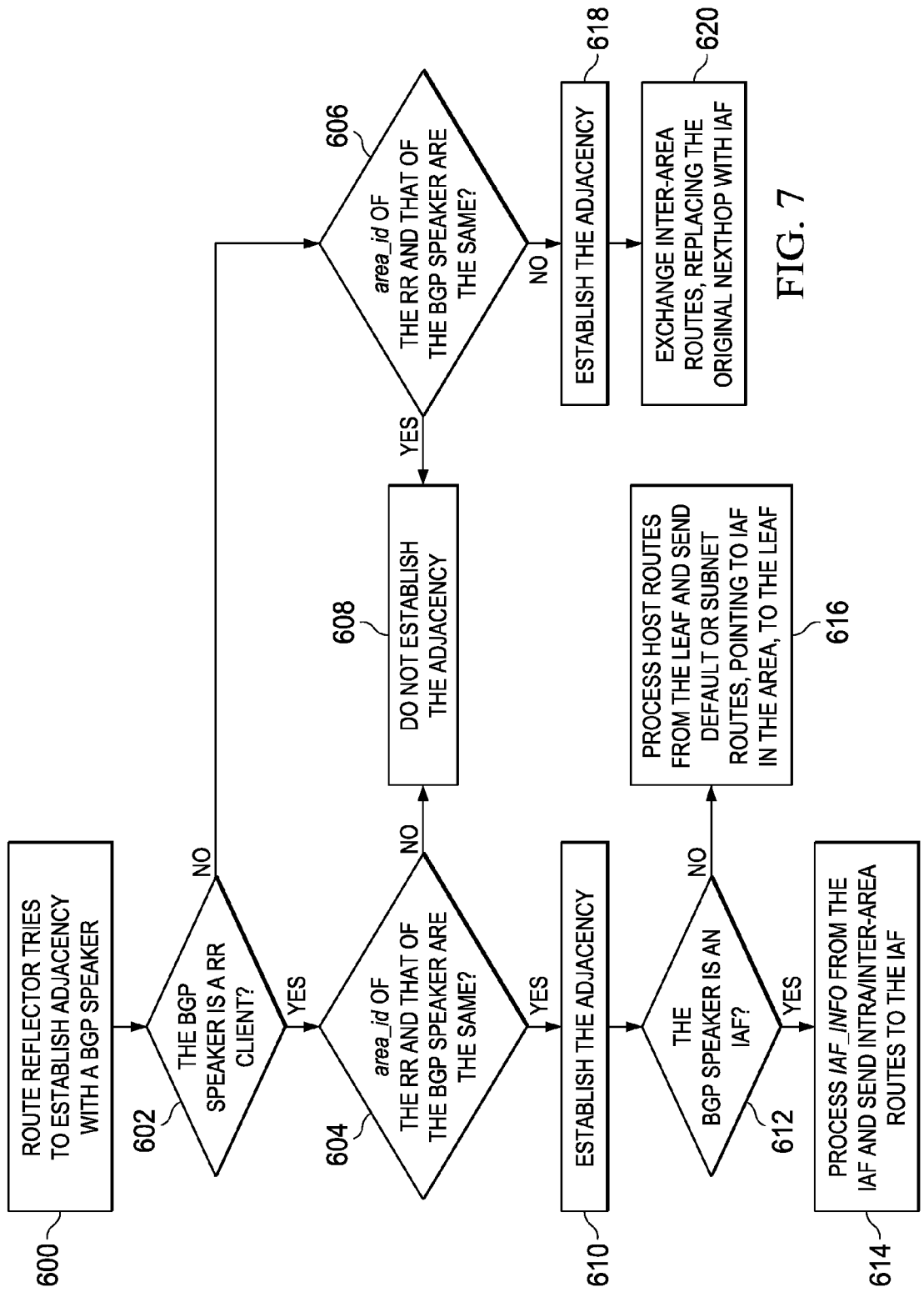
FIG. 7 is a flowchart illustrating operations of an example embodiment to distribute routes in a multilevel Vinci communication system.

FIG. 7 is a flowchart illustrating operation of one embodiment. In 600, an RR tries to establish an adjacency with a BGP speaker, triggered by user provisioning. In 602, a determination is made whether the BGP speaker is an RR client. If the BGP speaker is an RR client, in 604, a determination is made whether the area_id of the RR and the BGP speaker are the same. If it is determined in 602 that the BGP speaker is not an RR client, in 606, a determination is made whether the area_id of the RR is the same as that of the BGP speaker. If it is determined in 606 that the area_id of the RR is the same as that of the speaker, in 608, the adjacency is not established. Similarly, if in 604 it is determined that the area_ids of the RR and the BGP speaker are not the same, in 608, the adjacency is not established.

If in 604 it is determined that the area_id of the RR is the same as the area_id of the BGP speaker, in 610, the adjacency is established. Next, in 612, a determination is made whether the BGP speaker is an IAF. If it is determined in 612 that the BGP speaker is an IAF, in 614, IAF_INFO from the IAF is processed and intra-area and inter-area routes are sent to the IAF. If it is determined in 612 that the BGP speaker is not an IAF, in 616, host routes from the BGP speaker are processed and default or subnet routes pointing to the IAFs in the area are sent to the BGP speaker.

Returning to 606, if in that operation it is determined that the area_id of the RR and that of the BGP speaker are the same, in 618, the adjacency is established. In 620, inter-area routes are exchanged between the RR and the BGP speaker, with the original nexthop entries in the BGP speaker routing table being replaced with IAFs.

Various examples illustrating the process of FIG. 7 will now be described with reference to FIG. 6. In a first example, assuming RR1 572 Is trying to establish an adjacency with leaf11 524, in 602, it would be determined that the BGP speaker (i.e., leaf11 524) is an RR client and execution would proceed to 604. In 604, it would be determined that the area_id of the RR (RR1 572) is the same as that of the BGP speaker (leaf11 524) and execution would proceed to 610. In 612, it would be determined that the BGP speaker is not an IAF, and execution would proceed to 616, in which host routes from the leaf is processed and default or subnet routes pointing to the IAF (at spine11 520) are sent to the leaf (leaf11 524).

In another example, again referring to FIGS. 6 and 7, assuming RR1 572 is trying to establish an adjacency with RR2 574, in 602, it would be determined that the BGP speaker is not an RR client and execution would proceed to 606. In 606, it would be determined that the area_id of the RR (RR1 572) and the BGP speaker (RR2 574) are not the same and execution would proceed to 618. In 618, the adjacency would be established because the RR and the BGP speaker are RRs located in different areas. In 620, the RRs exchange inter-area routes, replacing the original nexthop in table entries with IAFs.

In another example, again referring to FIGS. 6 and 7, assuming RR1 572 is trying to establish an adjacency with spine21 528, in 602, it would be determined that the BGP speaker is an RR client and execution would proceed to 604. In 604, it would be determined that the area_id of the RR (RR1 572) and the BGP speaker (spine21 528) are not the same and execution would proceed to 608, in which the adjacency would not be established.

In yet another example, again referring to FIGS. 6 and 7, assuming RR1 572 is trying to establish an adjacency with another area1 512 RR (not shown), in 602, it would be determined that the BGP speaker is not an RR client and execution would proceed to 604. In 604, it would be determined that the area_id of the RR (RR1 572) and the BGP speaker (second area1 512 RR) are the same and execution would proceed to 608, in which the adjacency would not be established.

In still another example, again referring to FIGS. 6 and 7, assuming RR1 572 is trying to establish an adjacency with spine11 568, in 602, it would be determined that the BGP speaker is an RR client and execution would proceed to 604. In 604, it would be determined that the area_id of the RR (RR1 572) and the BGP speaker (spine11 520) are the same and execution would proceed to 610. In 610, the adjacency would be established. In 612, it would be determined that the BGP speaker is an IAF (IAF 568 disposed at spine11 520) and execution would proceed to 614. In 614, an IAF_INFO message from the IAF would be processed and intra- and inter-area routes would be sent to the IAF (IAF 568).

Certain embodiments described above employ an IAF to scale leaf routing tables and MAC tables, as well as to hide intra-area virtual machine mobility in a multilevel Vinci network environment. As shown above, the IAF may be deployed in L1 spines or leafs. As also shown above, a default routing scheme or a subnet-based scheme may be used for inter-area forwarding. Additional embodiments described above propose BGP enhancements for area awareness and nexthop modification to facilitate inter-area route distribution.

Note that in certain example implementations, the functions outlined herein may be implemented by logic encoded in one or more tangible, non-transitory media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 6, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 6, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, RRs 572, 574, include software in order to achieve the functions outlined herein. These activities can be facilitated by modules 580, 586. RRs 572, 574, can include memory elements (578, 584) for storing information to be used in achieving the functions as outlined herein. Additionally, RRs 572, 574, may include a processor (576, 582) that can execute software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Moreover, it should be noted that RRs 572, 574 (as well as any of the L2 spines, leafs, client type elements, network devices, etc.) may be generically referred to as network elements. As used herein in this Specification, the term 'network element' is meant to encompass any of the aforementioned elements, as well as routers, switches, cable boxes, iPads, end-user devices generally, endpoints, gateways, bridges, set-top boxes (STBs), loadbalancers, firewalls, inline service nodes, proxies, servers, processors, modules, or any other suitable device, component, element, proprietary appliance, or object operable to exchange data in a network environment. These network elements may include any suitable hardware, software, components, modules, interfaces, or objects that facilitate the operations thereof. This may be inclusive of appropriate algorithms and communication protocols that allow for the effective exchange of data or information. In certain embodiments, the activities described herein may be executed externally to these elements, or included in some other network element to achieve the intended functionality. Alternatively, these network elements may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

Note also that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining whether a first network element with which a second network element is attempting to establish an adjacency is a client type element;
   if the first network element is determined to be a client type element, determining whether the first and second network elements are in a same network area;
   if the first network element is a client type element and the first and second network elements are determined to be in the same network area, establishing the adjacency; and
   determining whether the first network element comprises an inter-area forwarder (IAF).

2. The method of claim 1, wherein if the first network element comprises the IAF, the method further comprises processing a message from the IAF and sending inter-area routes and intra-area routes to the IAF.

3. The method of claim 1, wherein if the first network element does not comprise the IAF, the method further comprises processing host routes from the first network element and sending routes pointing to a particular IAF.

4. The method of claim 3, wherein the routes pointing to the particular IAF comprise default routes.

5. The method of claim 3, wherein the routes pointing to the particular IAF comprise subnet routes.

6. The method of claim 1, wherein if the first network element is a client type element and the first and second network elements are determined to be in different network areas, the method further comprises prohibiting the adjacency from being established.

7. The method of claim 1, further comprising:
   determining whether the first and second network elements are in different network areas; and
   establishing an adjacency between the first and second network elements.

8. The method of claim 7, further comprising:
   exchanging inter-area routes and replacing original nexthops in routing tables of the first and second network elements with IAFs.

9. Logic encoded in one or more non-transitory tangible media that includes code for execution and when executed by a processor is operable to perform operations comprising:
   determining whether a first network element with which a second network element is attempting to establish an adjacency is a client type element;
   if the first network element is determined to be a client type element, determining whether the first and second network elements are in a same network area;
   if the first network element is a client type element and the first and second network elements are determined to be in the same network area, establishing the adjacency; and
   determining whether the first network element comprises an inter-area forwarder (IAF).

10. The logic of claim 9, the operations further comprising, wherein if the first network element comprises the IAF, processing a message from the IAF and sending inter-area routes and intra-area routes to the IAF.

11. The logic of claim 9, the operations further comprising, wherein if the first network element does not comprise the IAF, processing host routes from the first network element and sending to subnet routes or default routes pointing to a particular IAF.

12. The logic of claim 9, the operations further comprising, wherein if the first network element is a client type element and the first and second network elements are determined to be in different network areas, prohibiting the adjacency from being established.

13. The logic of claim 9 further comprising, the operations further comprising determining whether the first and second network elements are in different network areas and if so, establishing an adjacency between the first and second network elements.

14. The logic of claim 13, the operations further comprising:
exchanging inter-area routes and replacing original nexthops in routing tables of the first and second network elements with IAFs.

15. An apparatus comprising:
a memory element configured to store data;
a processor operable to execute instructions associated with the data; and
an area awareness module operable to interface with the memory element and the processor such that the apparatus is configured to:
determine whether a first network element with which a second network element is attempting to establish an adjacency is a client type element;
determine whether the first and second network elements are in a same network area, if the first network element is determined to be a client type element;
establish the adjacency, if the first network element is a client type element and the first and second network elements are determined to be in the same network area; and
determine whether the first network element comprises an inter-area forwarder (IAF).

16. The apparatus of claim 15, wherein the apparatus is further configured to:
process a message from the IAF and send inter-area routes and intra-area routes to the IAF if the first network element comprises the IAF.

17. The apparatus of claim 15, wherein the apparatus is further configured to:
process host routes from the first network element and send routes pointing to a particular IAF if the first network element does not comprise the IAF.

18. The apparatus of claim 15, wherein the apparatus is further configured to:
determine whether the first and second network elements are in different network areas, and if so, establish an adjacency between the first and second network elements.

19. The apparatus of claim 18, wherein the apparatus is further configured to:
exchange inter-area routes and replace original nexthops in routing tables of the first and second network elements with IAFs.

20. The method of claim 15, wherein the apparatus comprises one of a leaf switch, a spine switch, and a route reflector (RR), and wherein the second network element comprises an RR.

* * * * *